(12) United States Patent
Akkarakaran et al.

(10) Patent No.: US 11,297,579 B2
(45) Date of Patent: Apr. 5, 2022

(54) REFERENCE SIGNALING FOR LOW PEAK-TO-AVERAGE POWER RATIO

(71) Applicant: QUALCOMM Incorporated, San Diego, CA (US)

(72) Inventors: Sony Akkarakaran, Poway, CA (US); Wei Yang, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 16/747,348

(22) Filed: Jan. 20, 2020

(65) Prior Publication Data
US 2020/0236641 A1    Jul. 23, 2020

Related U.S. Application Data

(60) Provisional application No. 62/794,845, filed on Jan. 21, 2019.

(51) Int. Cl.
| | |
|---|---|
| *H04W 56/00* | (2009.01) |
| *H04B 1/12* | (2006.01) |
| *H04B 1/10* | (2006.01) |
| *H04L 5/00* | (2006.01) |
| *H04L 27/26* | (2006.01) |

(52) U.S. Cl.
CPC ...... *H04W 56/0005* (2013.01); *H04B 1/1036* (2013.01); *H04B 1/123* (2013.01); *H04L 5/0048* (2013.01); *H04L 27/2628* (2013.01)

(58) Field of Classification Search
CPC ..... H04B 1/1036; H04B 1/123; H04L 5/0048; H04L 27/2628; H04W 56/0005
See application file for complete search history.

(56) References Cited

U.S. PATENT DOCUMENTS

2016/0277229 A1    9/2016  Dick
2019/0207722 A1 *  7/2019  Gao ..................... H04B 7/0695

FOREIGN PATENT DOCUMENTS

| EP | 3444963 A1 | 2/2019 |
|---|---|---|
| WO | 2018016700 A1 | 1/2018 |

OTHER PUBLICATIONS

Iith, et al., "Performance of GPO and OFDM with PA Model and Windowing", 3GPP Draft, R1-165422, 3rd Generation Partnership Project (3GPP), Mobile Competence Center, 650, Route Des Lucioles, F-06921 Sophia-Antipolis Cedex, France, vol. Ran WG2, No. Nanjing, China, May 23, 2016-May 27, 2016, May 21, 2016 (May 21, 2016), XP051111, 10 pages, Retrieved from the Internet: URL:http://www.3gpp.org/ftp/tsg_ran/WG1_RL1/TSGR1_85/Docs/. [retrieved on May 21, 2016], Sect. 1. figures 2. 3.
(Continued)

*Primary Examiner* — David S Huang
(74) *Attorney, Agent, or Firm* — Harrity & Harrity, LLP

(57) ABSTRACT

Various aspects of the present disclosure generally relate to wireless communication. In some aspects, a user equipment may filter a group of uplink reference signals so that filtering delays of the group of uplink reference signals are consistent based at least in part on a filtering constraint for the group of uplink reference signals; and transmit the group of uplink reference signals. Numerous other aspects are provided.

30 Claims, 5 Drawing Sheets

(56) References Cited

OTHER PUBLICATIONS

International Search Report and Written Opinion—PCT/US2020/014383—ISA/EPO—dated May 13, 2020.
NTT DOCOMO, et al., "OFDM Radio Parameter Set in Evolved UTRA Downlink", 3GPP Draft, R1-050587, OFDM Radio Parameter Set in DL, 3rd Generation Partnership Project (3GPP), Mobile Competence Center, 650, Route Des-Lucioles, F-06921 Sophia-Antipolis Cedex, France, vol. Ran WG2, No. Sophia Antipolis, France, Jun. 16, 2005, Jun. 16, 2005 (Jun. 16, 2005), XP050111405, 25 pages, [retrieved on Jun. 16, 2005], p. 13.

\* cited by examiner

REFERENCE SIGNALING FOR LOW PEAK-TO-AVERAGE POWER RATIO

CROSS-REFERENCE TO RELATED APPLICATION

This Patent Application claims priority to Provisional Patent Application No. 62/794,845, filed on Jan. 21, 2019, entitled "REFERENCE SIGNALING FOR LOW PEAK-TO-AVERAGE POWER RATIO," and assigned to the assignee hereof. The disclosure of the prior Application is considered part of and is incorporated by reference in this Patent Application.

FIELD OF THE DISCLOSURE

Aspects of the present disclosure generally relate to wireless communication, and to techniques and apparatuses for reference signaling for low peak-to-average power ratio.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include filtering a group of uplink reference signals so that filtering delays of uplink reference signals of the group of uplink reference signals are consistent based at least in part on a filtering constraint for the group of uplink reference signals; and transmitting the group of uplink reference signals.

In some aspects, a UE for wireless communication may include memory and one or more processors operatively coupled to the memory. The memory and the one or more processors may be configured to filter a group of uplink reference signals so that filtering delays of uplink reference signals of the group of uplink reference signals are consistent based at least in part on a filtering constraint for the group of uplink reference signals; and transmit the group of uplink reference signals.

In some aspects, a non-transitory computer-readable medium may store one or more instructions for wireless communication. The one or more instructions, when executed by one or more processors of a UE, may cause the one or more processors to filter a group of uplink reference signals so that filtering delays of uplink reference signals of the group of uplink reference signals are consistent based at least in part on a filtering constraint for the group of uplink reference signals; and transmit the group of uplink reference signals.

In some aspects, an apparatus for wireless communication may include means for filtering a group of uplink reference signals so that filtering delays of uplink reference signals of the group of uplink reference signals are consistent based at least in part on a filtering constraint for the group of uplink reference signals; and means for transmitting the group of uplink reference signals.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
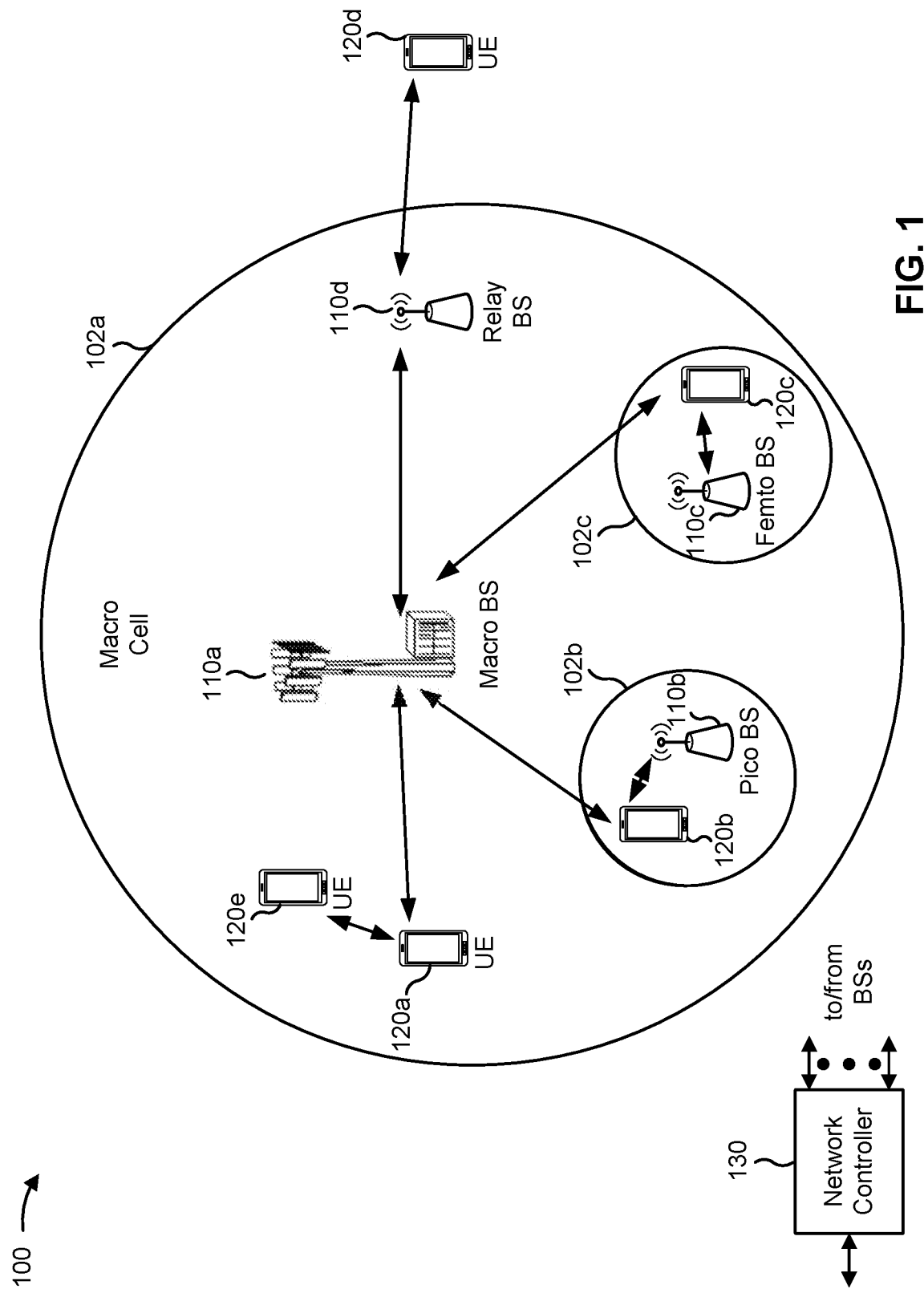
FIG. 1 is a block diagram conceptually illustrating an example of a wireless communication network, in accordance with various aspects of the present disclosure.

Peak-to-average power ratio (PAPR) is a measure of the peak power (e.g., transmission power) of a waveform in comparison to the waveform's average power. A low PAPR (indicating relatively low peak power relative to average power of a waveform) is desirable in some applications, because a low PAPR means that a transmitter can perform more efficiently and can transmit signals at a higher average power while still not being severely impacted by the non-linearity of the power amplifier at high powers.

One way to improve (e.g., reduce) PAPR is to use certain modulation schemes, such as pi/2 binary phase shift keying (pi/2 BPSK). Pi/2 BPSK may provide performance gains in comparison to other modulation schemes, such as quadrature phase shift keying (QPSK). When using pi/2 BPSK for uplink data transmissions, in combination with DFT-spread OFDM, the PAPR of an uplink data channel (e.g., a physical uplink shared channel (PUSCH)) may be better than that of a reference signal that is generated using some sequences, such as a Zadoff-Chu sequence. Therefore, the reference signal may be the constraining factor for PAPR reduction on the uplink.

One approach for reducing the PAPR of an uplink transmission is frequency-domain filtering of the uplink transmission. Frequency-domain filtering is referred to below as filtering. Filtering may be performed after discrete Fourier transform (DFT) spreading is performed on a set of tones, and before an inverse fast Fourier transform (IFFT) is performed on the output of the DFT spreading. Filtering may be applied to the physical uplink shared channel (PUSCH) and a reference signal associated with the PUSCH, and may be transparent to a receiver (e.g., a filter applied at the transmitter may appear as part of the channel at the receiver). In some aspects, a filter may use a set of taps. A tap may be based at least in part on a weight to be applied to a tone of the set of tones. For example, the UE may perform a DFT on a vector of taps to determine the weights for the DFT-spread tones, may multiply the weights and the DFT-spread tones, and may perform the IFFT on the filtered DFT-spread tones to generate a time-domain output based at least in part on the frequency domain input of the filtered DFT-spread tones. The filter may be configured or designed to reduce the PAPR of a transmission of the set of tones. This may yield further reduction in the PAPR of pi/2 BPSK modulated DFT-spread OFDM sequences.

In some cases, the filter may use a subset of taps selected from all taps of the filter. For example, the filter may use three consecutive taps. In some cases, the transmitter may select the subset of taps, and/or the subset of taps may not be known to the receiver. In some cases, the subset of taps may be variable between transmissions. For example, a first transmission (e.g., associated with a first grant) may be associated with a different subset of taps than a second transmission.

The usage of different subsets of taps for different transmissions may introduce differences in filtering delay for the different transmissions. For example, the IFFT may transform a frequency-domain input into a time-domain output representing a circular convolution of the filter tap vector with the time-domain version of the frequency domain signal prior to filtering, and the usage of different taps may mean that the time locations of the different transmissions may vary. This variability may be referred to herein as filtering delay. The filtering delay may be similar to multipath delay, which may be experienced over the wireless propagation channel from the transmitter to the receiver. In both cases, the receiver receives, with different delays and attenuations, multiple copies of the basic transmit waveform. In the case of multipath delay, the multiple copies represent multiple propagation paths (for example, a direct or line-of-sight path and a reflected path), whereas in the case of filtering delay, the copies were generated at the transmitter itself as a product of the filtering. Filtering delay may be detrimental to the performance of some transmissions. For example, when an uplink transmission is for a reference signal, such as a positioning reference signal (PRS), the filtering delay may reduce accuracy of the PRS. This may be exacerbated when different filters are used for different reference signals, since the filtering delay may be inconsistent, or when the different reference signals are associated with different bandwidths, since different bandwidths may be associated with different filtering delays.

Some techniques and apparatuses described herein provide filtering of a group of uplink reference signals so that filtering delays of the group of uplink reference signals are consistent with each other. For example, the filtering delays may be consistent with each other based at least in part on a filtering constraint for the group of uplink reference signals, as described in more detail elsewhere herein. In this way, filtering delays of positioning reference signals (and/or other types of signals) may be homogenized so that positioning operations of a network are more accurate. This, in turn, may improve network operation and conserve UE resources that might otherwise be used for more resource-intensive positioning methods, such as Global Positioning System (GPS)-based positioning methods and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
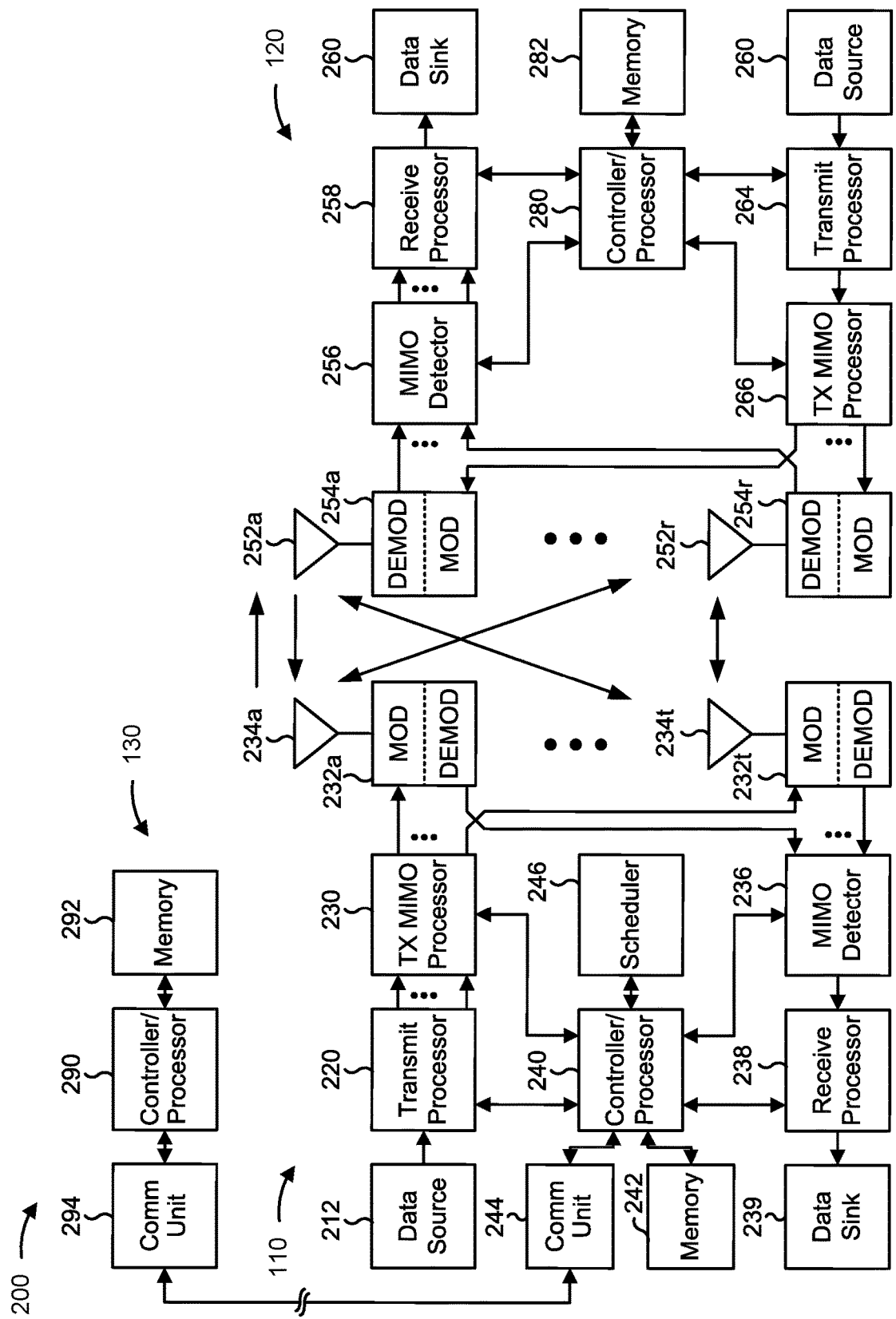
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reference signaling for low peak-to-average power ratio, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. A scheduler 246 may schedule UEs for data transmission on the downlink and/or uplink.

Figure 4:
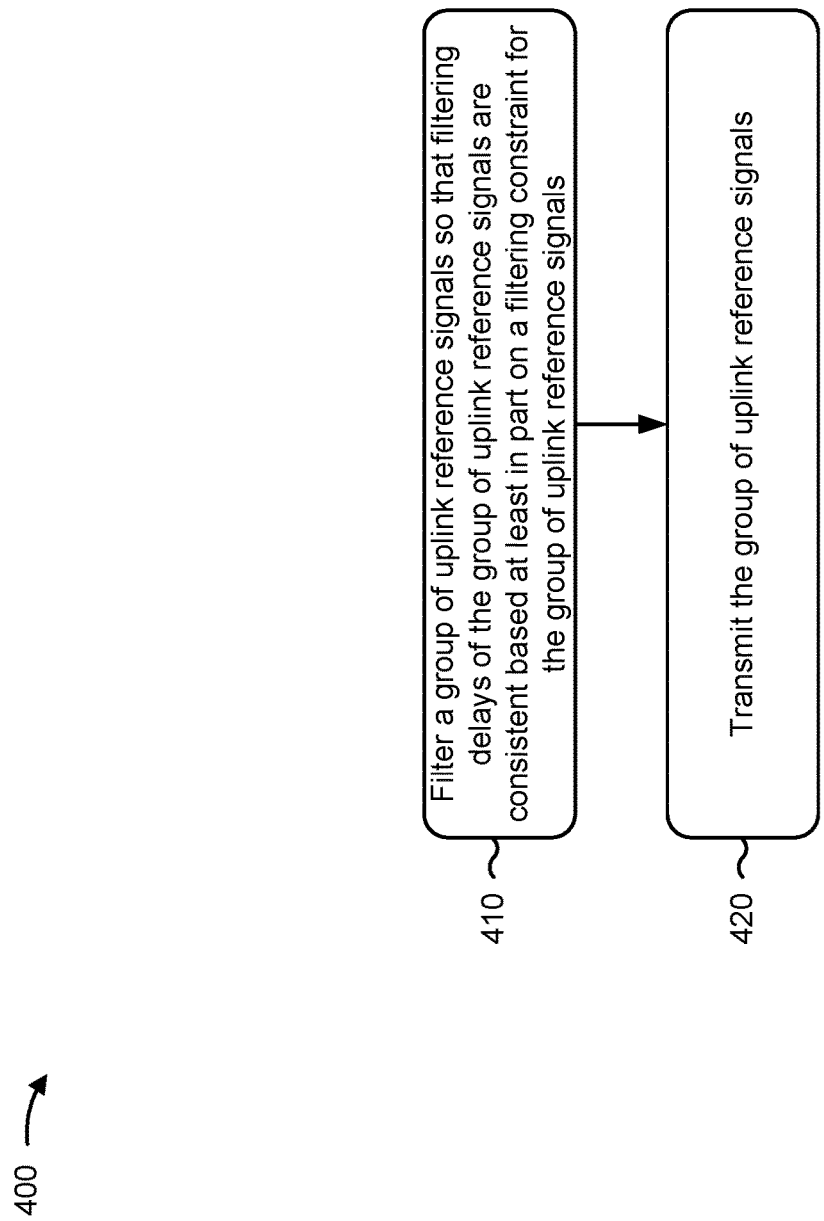
FIG. 4 is a diagram illustrating an example process performed, for example, by a user equipment, in accordance with various aspects of the present disclosure.

The stored program codes, when executed by processor 280 and/or other processors and modules at UE 120, may cause the UE 120 to perform operations described with respect to process 400 of FIG. 4 and/or other processes as described herein. The stored program codes, when executed by processor 240 and/or other processors and modules at base station 110, may cause the base station 110 to perform operations described with respect to process 400 of FIG. 4 and/or other processes as described herein. A scheduler 246 may schedule UEs for data transmission on the downlink and/or uplink.

In some aspects, UE 120 may include means for filtering a group of uplink reference signals so that filtering delays of the group of uplink reference signals are consistent based at least in part on a filtering constraint for the group of uplink reference signals, means for transmitting the group of uplink reference signals, means for receiving, from a base station, information indicating a configuration of the group or the filtering constraint, means for performing an inverse fast Fourier transform on the group of uplink reference signals after filtering the group of uplink reference signals and before transmitting the group of uplink reference signals, and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3:
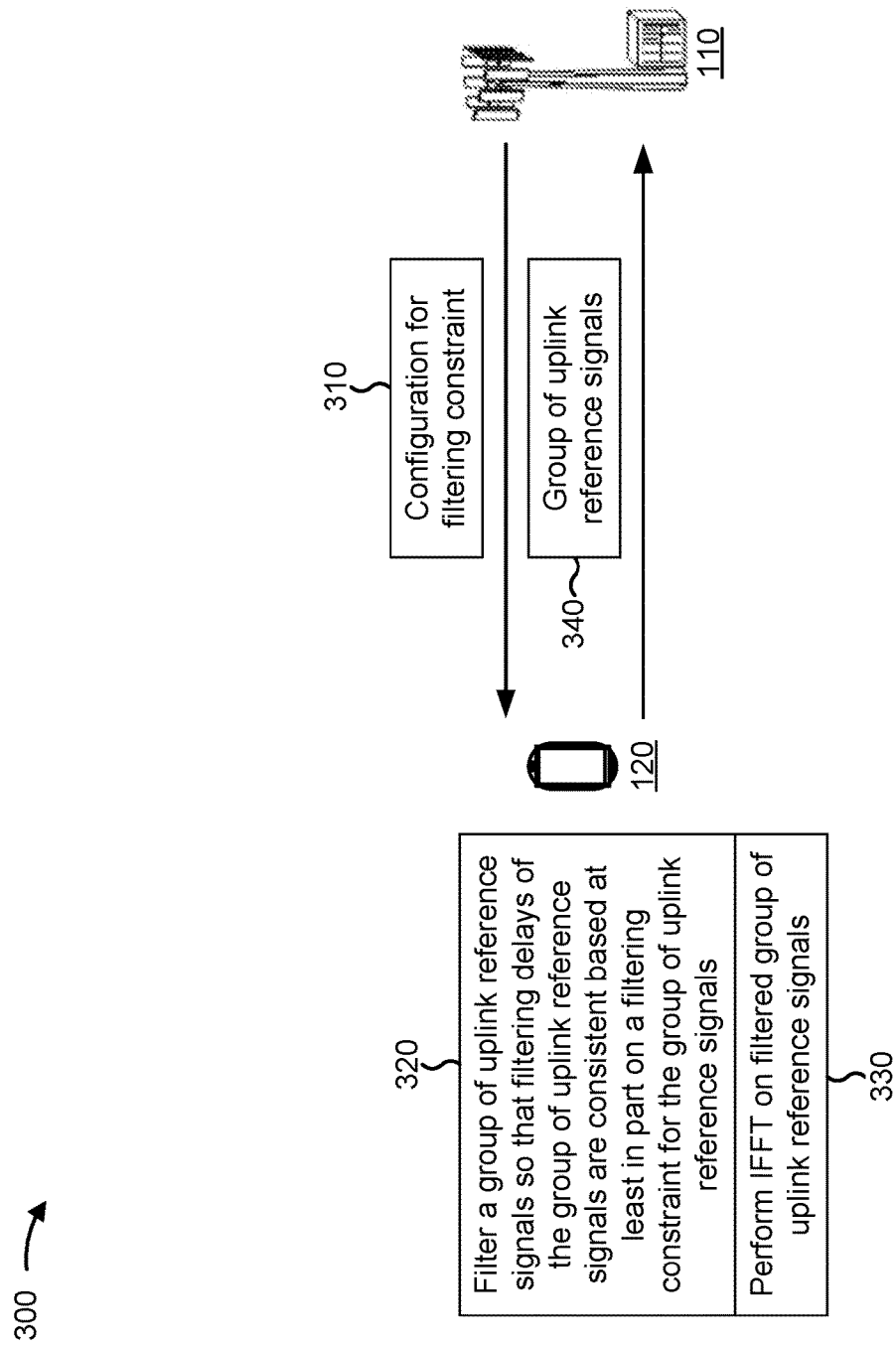
FIG. 3 is a diagram illustrating an example of reference signaling for low peak-to-average power ratio, in accordance with various aspects of the present disclosure.

FIG. 3 is a diagram illustrating an example 300 of reference signaling for low peak-to-average power ratio, in accordance with various aspects of the present disclosure. As shown, example 300 includes a UE 120 and a BS 110. For example, the UE 120 may transmit a group of uplink reference signals for the BS 110. In some aspects, the group of uplink reference signals may include, for example, a group of positioning reference signals (PRSs), a group of sounding reference signals (SRSs), a group of physical random access channel (PRACH) sequences or preambles, and/or the like. In some aspects, the group of uplink reference signals may include an SRS associated with a particular set use, such as an uplink beam management set use, a positioning reference signal set use, and/or the like. In some aspects, the group of uplink reference signals may be modulated using a particular modulation scheme, such as pi/2 BPSK, although techniques and apparatuses described herein are not limited to those involving pi/2 BPSK. For example, the group of uplink reference signals may be modulated using another modulation scheme, such as QPSK and/or the like.

As shown in FIG. 3, and by reference number 310, in some aspects, the BS 110 may provide information identifying a configuration for the filtering constraint. In some aspects, the information identifying the configuration may identify a configuration for the filter. For example, in some cases, the UE 120 may not determine the filter (e.g., the UE 120 may apply a filter that is specified by the BS 110). In such a case, the configuration may be for the filter.

In some aspects, the configuration may identify a set of filter coefficients for the filter. For example, the configuration may identify weights for the filter. In some aspects, the configuration may identify an activation time or a deactivation time for the group of uplink reference signals. For example, the configuration may identify when a group of uplink reference signals begins and/or ends, as described in more detail elsewhere herein. In some aspects, the configuration may indicate whether filtering is permitted for the group of uplink reference signals. For example, the configuration may indicate that filtering is permitted, or may indicate that only a center tap is permitted to be used for the group of uplink reference signals. In some aspects, the configuration may indicate that the UE is to select the coefficients of the filter, as long as the coefficients are the same for each uplink reference signal of the group of uplink reference signals.

In some aspects, the configuration may identify a quasi co-location (QCL) type of the filtering constraint. For example, the filtering constraint may be identified based at least in part on a QCL type, which may indicate a permissible filtering delay spread, a permissible average delay, a temporal filtering configuration, a spatial filtering configuration, and/or the like.

In some aspects, the configuration may be provided using a radio resource control (RRC) message, a media access control (MAC) control element (CE), downlink control information (DCI), implicitly using another QCL type indicator (e.g., a spatial transmit filtering QCL type), and/or the like.

In some aspects, the configuration may relate to multiple different types of uplink reference signals. For example, the configuration may identify a first QCL type or configuration for a first uplink reference signal type, a second QCL type or configuration for a second uplink reference signal type, and so on. In some aspects, the configurations for different types of uplink reference signals may be determined (e.g., by the BS 110) to enforce a same spectral shaping or propagation delay for the different types of uplink reference signals. For example, a first timing advance or filtering constraint may be configured for a first type of uplink reference signal and a second timing advance or filtering constraint may be configured for a second type of uplink reference signal so that a filtering delay inconsistency between the uplink reference signals is reduced (e.g., improved, minimized, and/or the like).

As shown by reference number 320, the UE 120 may filter the group of uplink reference signals so that filtering delays of the group of uplink reference signals are consistent based at least in part on a filtering constraint for the group of uplink reference signals. For example, the filtering constraint may be static (e.g., predefined, standardized, and/or the like) or may be configured by the information identifying the configuration. Such configuration may include the number of dominant filter taps, minimum attenuation levels for the non-dominant taps relative to the dominant tap or taps, and/or the like. The configuration may be different for different types of reference signals, for example, for a UL SRS or UL PRS as compared to a UL PUSCH demodulation reference signal. In some cases, the configuration may be specified in a standards specification.

In some aspects, the group of uplink reference signals may be grouped based at least in part on an identifier. For example, the group of uplink reference signals may include all reference signals (e.g., PRSs and/or the like) with a given PRS identifier. As another example, the group of uplink reference signals may include all uplink reference signals in a burst. A burst may be defined by a time window (e.g., from activation of the group of uplink reference signals to deactivation of the group of uplink reference signals), or may be defined in reference to a set of beam-sweeps. In some aspects, a beam-sweep may be defined based at least in part on a QCL relationship with a downlink beam. In such a case, the burst may be defined based at least in part on a corresponding downlink burst (e.g., based at least in part on a downlink PRS burst, a downlink channel state information reference signal burst, and/or the like). In some aspects, the group of uplink reference signals may be grouped based at least in part on a combination of the above and/or other factors.

In some aspects, the filtering constraint may be based at least in part on setting filter coefficients to a fixed value. For example, the fixed value may be specified or configured (e.g., by the configuration described above). In some aspects, the fixed value may be a function of the number of resource blocks of an uplink reference signal, a comb spacing of an uplink reference signal, and/or the like. In some aspects, the fixed value may indicate that no filtering is to be performed (e.g., only a center tap value is specified as nonzero, and other taps are zero). In some aspects, the filtering constraint may allow the UE to choose filter coefficients (e.g., weights, taps, and/or the like), as long as the filter coefficients are the same across all uplink reference signals in the group. This may improve PAPR by giving the UE more flexibility to filter for lower PAPRs. In some aspects, the UE 120 may select from the above approaches (e.g., based at least in part on whether the uplink reference signals in the group have the same bandwidth or different bandwidths). For example, when the signals have the same bandwidth, the UE may determine the filter so long as the filter is consistent between uplink reference signals. When the signals have different bandwidths, the UE may use no filter or may use a fixed value for the filter.

As shown by reference number 330, the UE 120 may perform an IFFT on the filtered group of uplink reference signals. As shown by reference number 340, the UE 120 may transmit the filtered and transformed group of uplink reference signals. In this way, PAPR for the group of uplink reference signals is improved while improving (e.g., minimizing, optimizing, homogenizing, and/or the like) filtering delay of the group of uplink reference signals relative to each other. Thus, positioning accuracy may be improved and transmission efficiency of the UE 120 may be improved. In some aspects, the BS 110 may receive the filtered and transformed group of uplink reference signals. The BS 110 may perform an operation based at least in part on the group of uplink reference signals, such as a positioning operation and/or the like.

In some aspects, the operations described herein may be performed for a downlink reference signal, such as a downlink channel state information reference signal (CSI-RS), a downlink positioning reference signal, and/or the like. This may be particularly helpful for high-frequency designs, such as >52.6 GHz designs. In such a case, the filtering constraints may be different for the group of uplink reference signals than for a group of downlink reference signals. For example, the group of uplink reference signals may be associated with a first QCL type as described elsewhere herein, and the group of downlink reference signals may be associated with a second QCL type as described elsewhere herein. Thus, the different operating constraints of the downlink (e.g., less focus on transmit power conservation, more focus on interference mitigation, and/or the like) may be more highly prioritized for downlink reference signals than for uplink reference signals.

In some aspects, for the case of downlink signals, filtering constraints may be indicated not just across different transmissions of one node (such as a base-station, transmit/receive point (TRP), remote radio head (RRH), an integrated-access-and-backhaul (IAB) node, and/or the like), but also for transmissions from different nodes. For example, the transmissions described above (e.g., CSI-RS, downlink positioning signal, and/or the like) may be used to make measurements that help determine the UE's position, for example, by computing differences in the arrival times of the transmissions. If the different signals undergo different filtering delays, the difference computation may not eliminate the filtering delay and may lead to inaccurate position estimation. Hence, all nodes may constrain the filtering so as to limit these differences due to filtering delay. The constraints may be requested by the node (e.g., a UE) that is being positioned, or by the node that computes the position (e.g., a UE, a base station, or a core network location server such as a location management function (LMF)). Alternatively, the nodes transmitting the downlink signals may directly report details of the filtering employed by the nodes transmitting the downlink signals, such as the filter taps, frequency domain responses, or constraints on the filter taps or frequency domain responses, to one or more nodes, such as the node being positioned or the node computing the position. This approach may further be extended to sidelink based transmissions. For example, filtering constraints may be applied across one or more transmissions made by one or more nodes on one or more links which may be downlinks, uplinks, or sidelinks. The constraints may be requested by one or more nodes, such as a node to be positioned or a node computing the position. The nodes applying the constraints may indicate the applied constraints (e.g., directly or based at least in part on an inquiry), to one or more other nodes, such as the node being positioned or the node computing the position.

In some aspects, the group of reference signals comprise at least one of a sounding reference signal for uplink beam management, a sounding reference signal for positioning, or a physical random access preamble. In this case, a base station may compute timing adjustment commands based on reception times of physical random access channel (PRACH) preambles or sounding reference signal (SRS) or other uplink transmissions from the UE.

As indicated above, FIG. 3 is provided as an example. Other examples may differ from what is described with respect to FIG. 3.

FIG. 4 is a diagram illustrating an example process 400 performed, for example, by a UE, in accordance with various aspects of the present disclosure. Example process 400 is an example where a UE (e.g., UE 120) performs reference signaling for low PAPR.

As shown in FIG. 4, in some aspects, process 400 may include filtering a group of uplink reference signals so that filtering delays of the group of uplink reference signals are consistent based at least in part on a filtering constraint for the group of uplink reference signals (block 410). For example, the UE (e.g., using controller/processor 280, transmit processor 264, TX MIMO processor 266, MOD 254, antenna 252, and/or the like) may filter a group of uplink reference signals. The UE may filter the group of uplink reference signals so that filtering delays of the group of uplink reference signals are consistent. The UE may filter the group of uplink reference signals based at least in part on a filtering constraint for the group of uplink reference signals.

As shown in FIG. 4, in some aspects, process 400 may include transmitting the group of uplink reference signals (block 420). For example, the UE (e.g., using controller/processor 280, transmit processor 264, TX MIMO processor 266, MOD 254, antenna 252, and/or the like) may transmit the group of uplink reference signals. In some aspects, the UE may perform an IFFT for the group of uplink reference signals. In some aspects, the UE may perform a DFT for the group of uplink reference signals (e.g., before filtering).

Process 400 may include additional aspects, such as any single aspect or any combination of aspects described below and/or in connection with one or more other processes described elsewhere herein.

In a first aspect, the group of uplink reference signals comprise positioning reference signals. In a second aspect, alone or in combination with the first aspect, the group of uplink reference signals comprises reference signals with a particular reference signal identifier. In a third aspect, alone or in combination with one or more of the first and second aspects, the group of uplink reference signals comprises reference signals included in a particular burst. In a fourth aspect, alone or in combination with one or more of the first through third aspects, the particular burst is defined based at least in part on a time window. In a fifth aspect, alone or in combination with one or more of the first through fourth aspects, the particular burst is defined based at least in part on a beam-sweep. In a sixth aspect, alone or in combination with one or more of the first through fifth aspects, the beam-sweep is defined based at least in part on a quasi co-location relationship with a downlink beam or a downlink beam burst.

In a seventh aspect, alone or in combination with one or more of the first through third aspects, the filtering constraint is to use a specified or configured filter for the group of uplink reference signals. In an eighth aspect, alone or in combination with one or more of the first through seventh aspects, the filtering constraint is to use a same filter for each uplink reference signal of the group of uplink reference signals. In a ninth aspect, alone or in combination with one or more of the first through eighth aspects, the filtering constraint is based at least in part on whether the group of reference signals have a same bandwidth as each other or different bandwidths than each other. In a tenth aspect, alone or in combination with one or more of the first through ninth aspects, the UE may receive, from a base station, information indicating a configuration of the group or the filtering constraint. In an eleventh aspect, alone or in combination with one or more of the first through tenth aspects, the information indicating the configuration of the group or the filtering constraint comprises a quasi co-location type. In a twelfth aspect, alone or in combination with one or more of the first through eleventh aspects, the information indicating the configuration of the group or the filtering constraint is based at least in part on a signal type of the group of reference signals.

In a thirteenth aspect, alone or in combination with one or more of the first through twelfth aspects, the group of reference signals comprise at least one of a sounding reference signal for uplink beam management, a sounding reference signal for positioning, or a physical random access preamble. In this case, a base station may compute timing adjustment commands based on reception times of physical random access channel (PRACH) preambles or sounding reference signal (SRS) or other uplink transmissions from the UE. These timing adjustments may be computed differently for transmissions that involve different filtering configurations or constraints (for example, for QPSK or Zadoff-Chu transmissions that don't involve filtering, as opposed to pi/2 BPSK transmissions that do involve filtering). In a fourteenth aspect, alone or in combination with one or more of the first through thirteenth aspects, a configuration of the group or the filtering constraint is different for the group of uplink reference signals than a configuration of a group of downlink reference signals of a same signal type. In a fifteenth aspect, alone or in combination with one or more of the first through fourteenth aspects, the UE may perform an inverse fast Fourier transform on the group of uplink reference signals after filtering the group of uplink reference signals and before transmitting the group of uplink reference signals.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
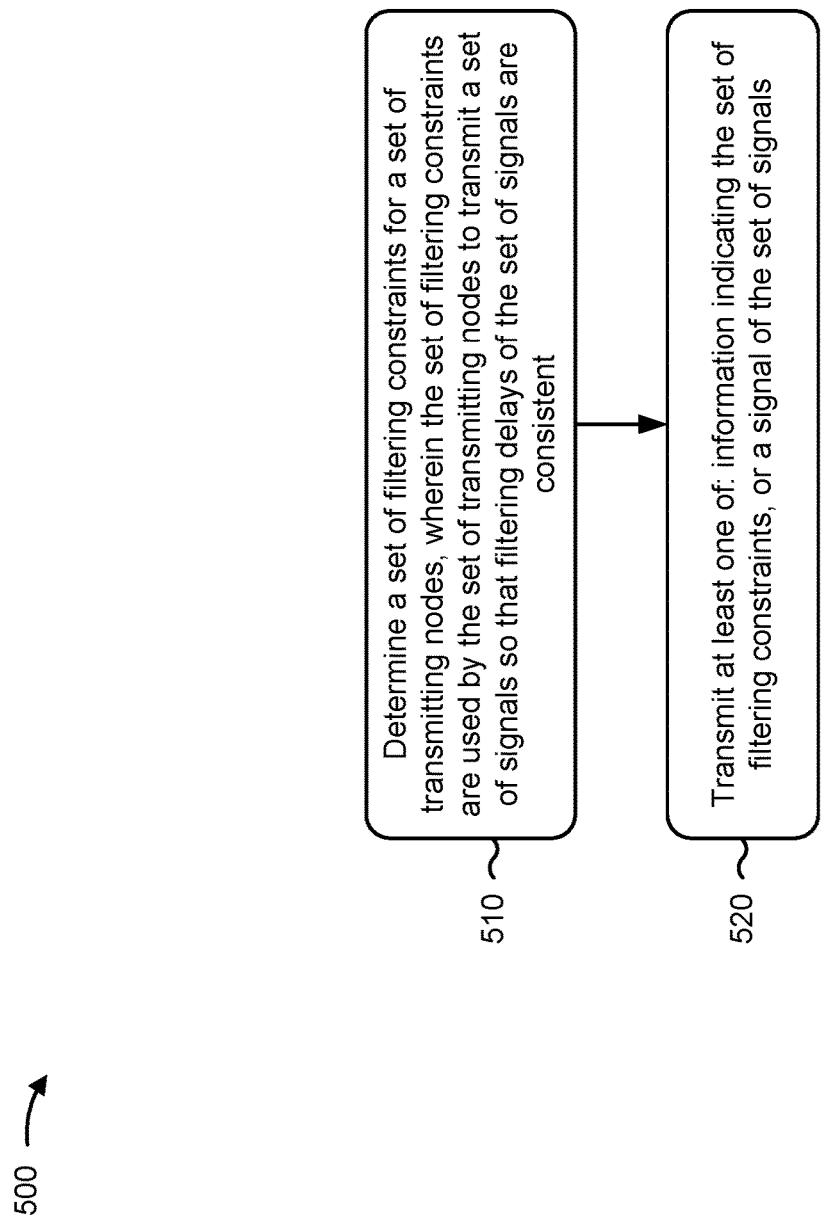
FIG. 5 is a diagram illustrating an example process performed, for example, by a wireless node, in accordance with various aspects of the present disclosure.

FIG. 5 is a diagram illustrating an example process 500 performed, for example, by a wireless node, in accordance with various aspects of the present disclosure. The wireless node may be a base station (e.g., a BS 110), a UE (e.g., UE 120), a network device (e.g., network controller 130, a core network device such as a location management function (LMF), and/or the like). Furthermore, FIG. 5 refers to a set of transmitting nodes (e.g., one or more wireless nodes), a recipient node (e.g., a wireless node), and a network device. In some aspects, the wireless node performing the operations of FIG. 5 may be one of the set of transmitting nodes. In some aspects, the wireless node performing the operations of FIG. 5 may be the recipient node. In some aspects, the wireless node performing the operations of FIG. 5 may be the network device. Example process 500 is an example where the wireless node performs operations associated with coordinating filtering constraints of the set of transmitting nodes so that filtering delays of a set of signals are consistent.

As shown in FIG. 5, in some aspects, process 500 may include determining a set of filtering constraints for a set of transmitting nodes, wherein the set of filtering constraints are used by the set of transmitting nodes to transmit a set of signals so that filtering delays of the set of signals are consistent (block 510). For example, the wireless node (e.g., using antenna 252, DEMOD 254, MIMO detector 256, receive processor 258, controller/processor 280, antenna 234, DEMOD 232, MIMO detector 236, receive processor 238, controller/processor 240, and/or the like) may determine a set of filtering constraints for a set of transmitting nodes, as described above. In some aspects, the set of filtering constraints are used by the set of transmitting nodes to transmit a set of signals so that filtering delays of the set of signals are consistent. In some aspects, the wireless node may determine the set of filtering constraints based at least in part on receiving information indicating the set of filtering constraints. A filtering constraint is described in more detail elsewhere herein. In some aspects, the wireless node may determine the set of filtering constraints based at least in part on an indication that the set of filtering constraints is to be used. For example, a recipient node or network device may provide an indication that the set of filtering constraints is to be used.

As used herein, the set of signals may include one or more signals and the set of transmitting nodes may include one or more nodes. In some aspects, the set of signals may include a plurality of signals and the set of transmitting nodes may include a plurality of transmitting nodes. Thus, "determining a set of filtering constraints for a set of transmitting nodes" may refer to determining a single filtering constraint for a single transmitting node, such as when the wireless node is the single transmitting node. Alternatively, "determining a set of filtering constraints for a set of transmitting nodes" may refer to determining a plurality of filtering constraints for a plurality of transmitting nodes.

As further shown in FIG. 5, in some aspects, process 500 may include transmitting at least one of: information indicating the set of filtering constraints, or a signal of the set of signals (block 520). For example, the wireless node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit at least one of information indicating the set of filtering constraints, or a signal of the set of signals, as described above. For example, the wireless node may transmit information indicating the set of filtering constraints when the wireless node is a network device, a recipient node, or one of the transmitting nodes (e.g., may coordinate the set of filtering constraints with the other transmitting node(s)). The wireless node may transmit a signal of the set of signals based at least in part on the wireless node being one of the set of transmitting nodes.

Process 500 may include additional aspects, such as any single aspect or any combination of aspects described below and/or in connection with one or more other processes described elsewhere herein.

In a first aspect, the wireless node is included in the set of transmitting nodes, and determining the respective filtering constraints is based at least in part on receiving an indication of the set of filtering constraints.

In a second aspect, alone or in combination with the first aspect, the indication is received from at least one of a recipient node of the set of signals or a network device.

In a third aspect, alone or in combination with one or more of the first and second aspects, the set of signals is for determination of a location of a recipient node of the set of signals.

In a fourth aspect, alone or in combination with one or more of the first through third aspects, the set of signals comprise at least one of one or more downlink signals, one or more sidelink signals, or one or more uplink signals.

In a fifth aspect, alone or in combination with one or more of the first through fourth aspects, the set of transmitting nodes comprises a plurality of transmitting nodes and the set of signals comprises a plurality of signals.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   filtering a group of uplink reference signals so that filtering delays of the group of uplink reference signals are consistent based at least in part on a filtering constraint for the group of uplink reference signals; and
   transmitting the group of uplink reference signals.

2. The method of claim 1, wherein the group of uplink reference signals comprise positioning reference signals.

3. The method of claim 1, wherein the group of uplink reference signals comprises reference signals with a particular reference signal identifier.

4. The method of claim 1, wherein the group of uplink reference signals comprises reference signals included in a particular burst.

5. The method of claim 4, wherein the particular burst is defined based at least in part on a time window.

6. The method of claim 4, wherein the particular burst is defined based at least in part on a beam-sweep.

7. The method of claim 6, wherein the beam-sweep is defined based at least in part on a quasi co-location relationship with a downlink beam or a downlink beam burst.

8. The method of claim 1, wherein the filtering constraint is to use a specified or configured filter for the group of uplink reference signals.

9. The method of claim 1, wherein the filtering constraint is to use a same filter for each uplink reference signal of the group of uplink reference signals.

10. The method of claim 1, wherein the filtering constraint is based at least in part on whether the group of uplink reference signals have a same bandwidth as each other or different bandwidths than each other.

11. The method of claim 1, further comprising:
receiving, from a base station, information indicating a configuration of the group of uplink reference signals or the filtering constraint.

12. The method of claim 11, wherein the information indicating the configuration of the group of uplink reference signals or the filtering constraint comprises a quasi co-location type.

13. The method of claim 11, wherein the information indicating the configuration of the group of uplink reference signals or the filtering constraint is based at least in part on a signal type of the group of uplink reference signals.

14. The method of claim 1, wherein the group of uplink reference signals comprise at least one of a sounding reference signal for uplink beam management, a sounding reference signal for positioning, or a physical random access preamble.

15. The method of claim 1, wherein a configuration of the group of uplink reference signals or the filtering constraint is different for the group of uplink reference signals than a configuration of a group of downlink reference signals of a same signal type.

16. The method of claim 1, further comprising:
performing an inverse fast Fourier transform on the group of uplink reference signals after filtering the group of uplink reference signals and before transmitting the group of uplink reference signals.

17. A user equipment (UE) for wireless communication, comprising:
a memory; and
one or more processors operatively coupled to the memory, the memory and the one or more processors configured to:
filter a group of uplink reference signals so that filtering delays of the group of uplink reference signals are consistent based at least in part on a filtering constraint for the group of uplink reference signals; and
transmit the group of uplink reference signals.

18. The UE of claim 17, wherein the group of uplink reference signals comprise positioning reference signals.

19. The UE of claim 17, wherein the group of uplink reference signals comprises reference signals with a particular reference signal identifier.

20. The UE of claim 17, wherein the group of uplink reference signals comprises reference signals included in a particular burst.

21. The UE of claim 20, wherein the particular burst is defined based at least in part on a time window.

22. The UE of claim 20, wherein the particular burst is defined based at least in part on a beam-sweep.

23. The UE of claim 22, wherein the beam-sweep is defined based at least in part on a quasi co-location relationship with a downlink beam or a downlink beam burst.

24. The UE of claim 17, wherein the constraint is based at least in part on whether the group of uplink reference signals have a same bandwidth as each other or different bandwidths than each other.

25. The UE of claim 17, wherein the memory and the one or more processors are further configured to:
receive, from a base station, information indicating a configuration of the group of uplink reference signals or the filtering constraint.

26. The UE of claim 25, wherein the information indicating the configuration of the group of uplink reference signals or the filtering constraint comprises a quasi co-location type.

27. The UE of claim 25, wherein the information indicating the configuration of the group of uplink reference signals or the filtering constraint is based at least in part on a signal type of the group of uplink reference signals.

28. The UE of claim 17, wherein the group of uplink reference signals comprise at least one of a sounding reference signal for uplink beam management, a sounding reference signal for positioning, or a physical random access preamble.

29. The UE of claim 17, wherein a configuration of the group of uplink reference signals or the filtering constraint is different for the group of uplink reference signals than a configuration of a group of downlink reference signals of a same signal type.

30. The UE of claim 17, wherein the memory and the one or more processors are further configured to:
performing an inverse fast Fourier transform on the group of uplink reference signals after filtering the group of uplink reference signals and before transmitting the group of uplink reference signals.

* * * * *